Feb. 14, 1961 A. W. CARLSON 2,972,063

BINARY COUNTING

Filed Jan. 21, 1958 2 Sheets-Sheet 1

INVENTOR.
ARTHUR W. CARLSON
BY
Wade Koontz and
Martin J. Finnegan
ATTORNEYS

Feb. 14, 1961

A. W. CARLSON

BINARY COUNTING 2,972,063

Filed Jan. 21, 1958

2 Sheets-Sheet 2

INVENTOR.
ARTHUR W. CARLSON

BY Wade, Koontz and
Martin J. Finnegan
ATTORNEYS

United States Patent Office 2,972,063

Patented Feb. 14, 1961

2,972,063

BINARY COUNTING

Arthur William Carlson, Harrison, Maine, assignor to the United States of America as represented by the Secretary of the Air Force Filed Jan. 21, 1958, Ser. No. 710,378

3 Claims. (Cl. 307—88.5)

(Granted under Title 35, U.S. Code (1952), sec. 266)

The invention described herein may be manufactured and used by or for the United States Government for governmental purposes without payment to me of any royalty thereon.

This invention relates to counting operatons, and particularly to methods and means for registering a count by the processing of electrical pulses having a repetition rate extending into the megacycle range.

Heretofore high speed pulse counters, operating on the "two-value" principles of the binary code, have been prone to the development of erroneous counts, the error tendency being inherent in the mode of operation, particularly that feature of the count shift process which introduces sharp fluctuations in electrical load, from one counting step to the next, whenever the count sequence is such as to sharply increase or decrease the number of counting stages that must undergo position-reversal in order to register the correct digital total. Thus, if the counting chain consists of five bistable stages, with each stage being embodied in a two-state binary unit ("flip-flop") the stepping of the count from a given binary value to the next may involve a change in state for only one of the five flip-flop units; yet on the very next pulsing step it may be necessary for all five units to undergo reversal—for example, from digital values 0–1–1–1–1 to 1–0–0–0–0. These sharp variations in pulse patterns, when they occur with micro-second frequency, impose electrical loading problems that are difficult to manage, especially when the circuitry includes gating devices for the simultaneous switching of all stages requiring switching on any given count.

The present invention provides a method and means for significantly lessening the incidence of switching transients and spurious pulses in a multi-stage digital counting chain, the method being characterized by incorporating into the counting scheme a count-shifting procedure of novel concept, namely, the concept of electrically gating the flow of stage-changing pulses to the successive binary stages in such manner that not more than two stages of the chain are caused to undergo a change in state ("0" to "1," or "1" to "0") for any single count increment.

Another characteristic of the inventon is the provision of a combination of surface-barrier transistors and pulse gating devices inter-related in a novel circuit structure to achieve the indicated results.

These and other objects and characteristics of the invention will be apparent upon examination of the following description of the embodiment of the invention illustrated in the accompanying drawings wherein.

Figure 1:
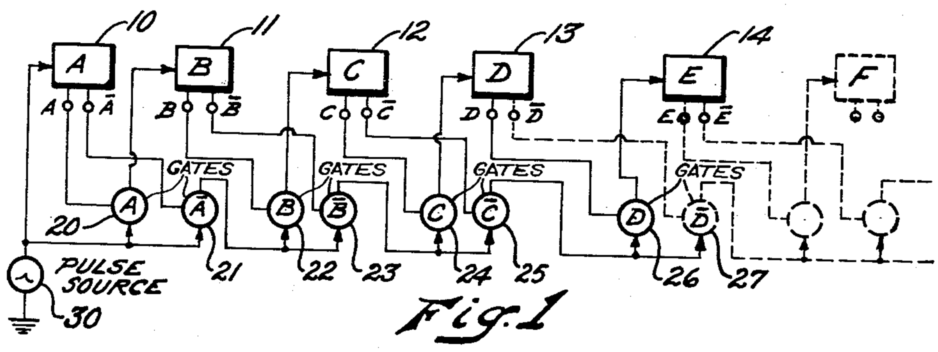
Fig. 1 is a diagram, in block form, of circuitry embodying the invention.
Figure 3:
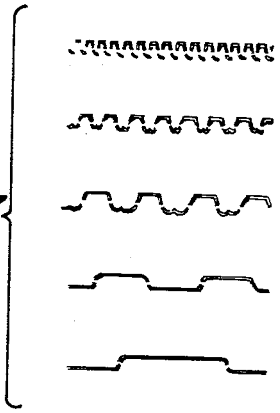
Figure 5:
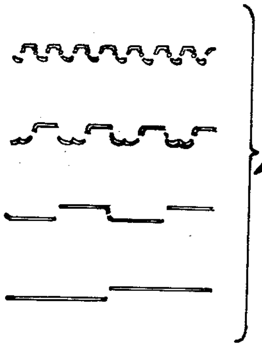
Figure 4:
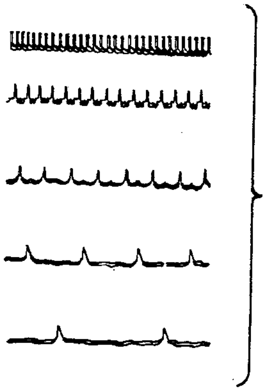

Figs. 3, 4, and 5 are graphs showing wave forms and pulse patterns characteristic of the circuitry of Fig. 1, in actual operation.

Referring first to Fig. 1, bistable units 10 to 14, inclusive, and gates 20 to 27, inclusive, are inter-related to convert successive pulses from source 30 into a progressive digital count in a binary form that deviates from the conventional binary code, in that in moving from one binary total to the next it is never necessary to change the individual digital representations of more than two of the counting stages. For example, in a five-stage counter, as illustrated, the successive counting patterns are as follows:

*Counter stage*

| Count | A | B | C | D | E | Stages Changing State |
|---|---|---|---|---|---|---|
| 0 | 0 | 0 | 0 | 0 | 0 | Initial State. |
| 1 | 1 | 0 | 0 | 0 | 0 | A |
| 2 | 0 | 1 | 0 | 0 | 0 | A B |
| 3 | 1 | 1 | 1 | 0 | 0 | A C |
| 4 | 0 | 0 | 1 | 0 | 0 | A B |
| 5 | 1 | 0 | 1 | 1 | 0 | A D |
| 6 | 0 | 1 | 1 | 1 | 0 | A B |
| 7 | 1 | 1 | 0 | 1 | 0 | A C |
| 8 | 0 | 0 | 0 | 1 | 0 | A B |
| 9 | 1 | 0 | 0 | 1 | 1 | A E |
| 10 | 0 | 1 | 0 | 1 | 1 | A B |
| 11 | 1 | 1 | 1 | 1 | 1 | A C |
| 12 | 0 | 0 | 1 | 1 | 1 | A B |
| 13 | 1 | 0 | 1 | 0 | 1 | A D |
| 14 | 0 | 1 | 1 | 0 | 1 | A B |
| 15 | 1 | 1 | 0 | 0 | 1 | A C |
| 16 | 0 | 0 | 0 | 0 | 1 | A B |
| 17 | 1 | 0 | 0 | 0 | 1 | A |
| 18 | 0 | 1 | 0 | 0 | 1 | A B |
| 19 | 1 | 1 | 1 | 0 | 1 | A C |
| 20 | 0 | 0 | 1 | 0 | 1 | A B |
| 21 | 1 | 0 | 1 | 1 | 1 | A D |
| 22 | 0 | 1 | 1 | 1 | 1 | A B |
| 23 | 1 | 1 | 0 | 1 | 1 | A C |
| 24 | 0 | 0 | 0 | 1 | 1 | A B |
| 25 | 1 | 0 | 0 | 1 | 0 | A E |
| 26 | 0 | 1 | 0 | 1 | 0 | A B |
| 27 | 1 | 1 | 1 | 1 | 0 | A C |
| 28 | 0 | 0 | 1 | 1 | 0 | A B |
| 29 | 1 | 0 | 1 | 0 | 0 | A D |
| 30 | 0 | 1 | 1 | 0 | 0 | A B |
| 31 | 1 | 1 | 0 | 0 | 0 | A C |
| 32 | 0 | 0 | 0 | 0 | 0 | A B |

By reference to the final column of the foregoing table, it will be seen that not more than two stages change state in response to each new pulse reception. While the table illustrates the code as applied to a live-stage counter, the coding scheme is not limited in this respect. No matter how long the counter, only two at the most change state at a given count. For example, if it is desired to extend the code to a six-stage counter with a sixth stage F, the columns should be lengthened to accommodate a count of 64; the column for F should consist of "0's" down to count 16, then change to "1's" at count 17, continue with thirty-two "1's" and with the balance "0's" for the remainder of the count. Here the cycle repeats. In other words, with the introduction of a sixth stage, the state of the addition changes at a count where, prior to the step, only the first stage of the counter changed state.

In cycling the counter once, there are two counts where only the first stage changes. Therefore, in adding another stage, have it change state at one of these counts, Since the capacity of the counter is doubled with this addition, there are in the enlarged counter two counts with only the first-stage change.

The code described above is not the only one with the property of a maximum of two stages changing state at a given count because, with exception of the first, one has two choices at each counter stage for the count at which that stage changes. There are $2^{N-1}$ ways of doing this with the various stages showing patterns of zeros and ones (first stage alternate "0's" and "1's," second stage two "0's" and two "1's," etc.) where N is the number of stages.

In Fig. 1 the rectangular blocks represent the binary elements of the counter (such as flip-flops). By a pulse application these binary elements have their state changed. For example, if stage A is in the state where lead A is high and lead Ā low, the application of a pulse to stage A causes a change of state to lead A low and lead Ā high. The circles represent gates of which there are $2N-3$, where N is the number of stages. The gates are controlled by the binary elements. The letters labeling the gates indicate the stage and lead controlling them. For example, the gate marked B̄ is controlled by the lead B̄ of stage B. The arrowheads indicate the path taken by the pulse through a gate when it is enabled. In describing the operation of the counter, it will be assumed that a gate is enabled when the lead controlling it is high. A counter stage will be said to be in the state "1" if the unprimed lead is high, and in the state "0" if the unprimed lead is low (or the primed lead high).

With all stages in the counter initially in the zero state, gates Ā, B̄, and C̄ are enabled. When a pulse is obtained from the pulse source, it goes directly to stage A, changing A to the state "1." It also passes through gates Ā, B̄, and C̄, but no farther (for the five-stage counter under consideration). After the first pulse, the stage A is "1" and the rest "0" with gates A, B̄, and C̄ enabled.

The second pulse goes directly to stage A (as do all pulses), changing A to "0." It also passes through gate A to stage B, making B, "1." Gates Ā, B, C̄, and D̄ are now enabled.

The third pulse changes A to "1" and goes through gates Ā and B to stage C, changing C from "0" to "1." Gates A, B, C, and D̄ are enabled.

The fourth pulse changes A to "0" and B to "0," enabling gates Ā, B̄, C, and D̄. The circuit continues to count in this manner as shown in Fig. 1.

Figure 2:
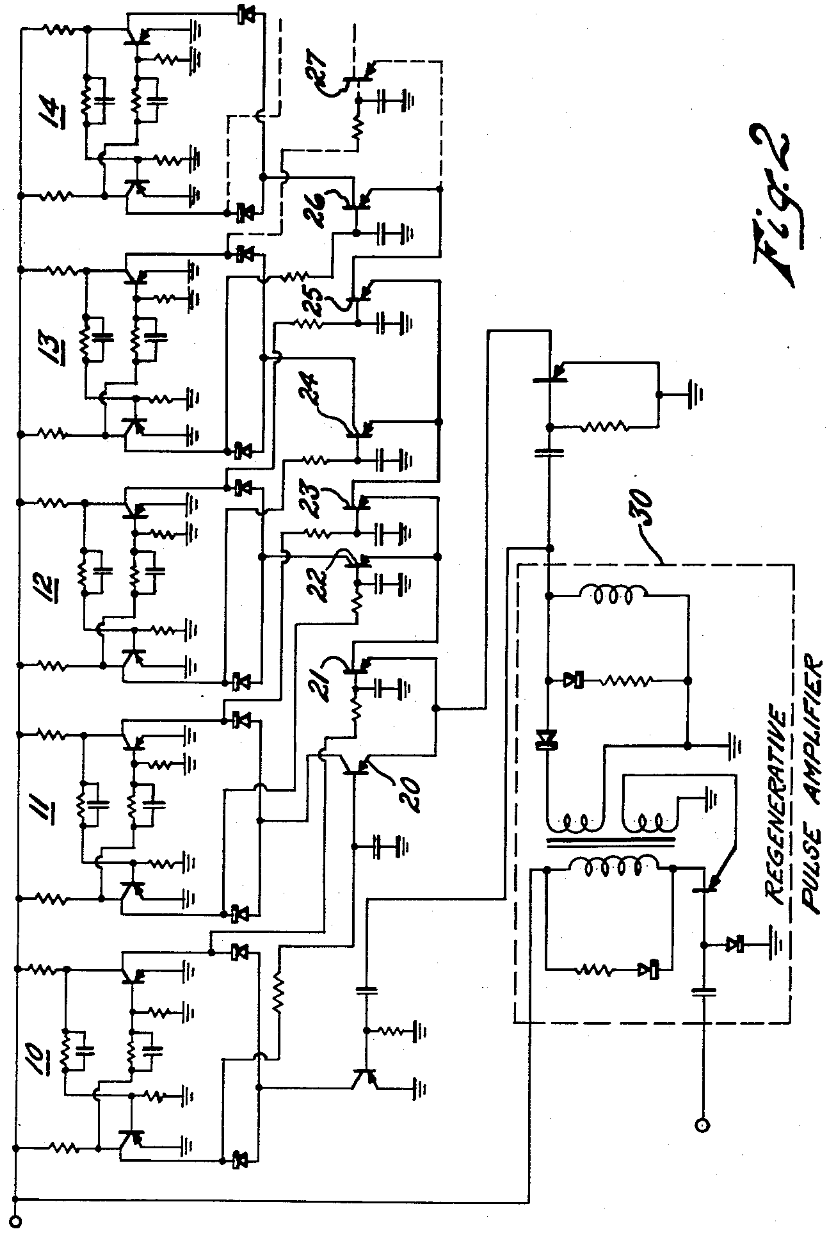
Fig. 2 shows details of the circuitry of Fig. 1.

Fig. 2 is a circuit diagram of five stages of a seven-stage counter operating with supply voltages ranging from 1.5 to 4.5 volts (which was not exceeded for fear of damaging the transistors), and capable of counting 0.1 μsec. pulses up to a repetition rate of 4 mc./sec. Fig. 3 is a photograph of the collector waveforms of the first five stages of the counter, counting 0.1 μsec. pulses at 1 mc. p.r.f. Fig. 4 is a photograph showing the pulses in the counter of Fig. 3. In the first row are the 1-mc. pulses being counted. The remaining waveforms are the pulses going to the second, third, fourth, and fifth stages in that order from the top.

For comparison with Fig. 3, Fig. 5 shows the collector waveforms of a conventional four-stage binary counter constructed with surface-barrier transistors.

For the purpose of summarizing, the advantages of the hereindisclosed counter are:

(1) Fewer transients than in the ordinary binary counter because only two counter stages at most change state at a given count.

(2) Simultaneous pulsing (coincident with count pulse) when two stages are to change state.

(3) A lighter and more uniform load on the count pulse source than in the ordinary binary counter.

(4) Simple gating circuitry.

What is claimed is:

1. An impulse responsive circuit comprising a plurality of flip-flops having two outputs and a trigger input, a plurality of coincidence means arranged in pairs, with successive pairs connected to and responsive to the respective outputs of the preceding flip-flop unit, and with one of each pair of said means being additionally connected to and responsive to the output of one only of the preceding pair of said coincidence means, and each of said flip-flop trigger inputs being connected to and responsive to the other only of the preceding pair of said coincidence means, so that not more than two of said flip-flop units can change state in any one impulse-receiving cycle, and means for priming said coincidence means.

2. A digital counting system including, in combination with a plurality of flip-flop units and a plurality of pulse-gating devices connected serially in a single electrical series circuit in which successive pulse-gating devices occupy positions intermediate successive flip-flop units, a second set of pulse-gating devices connected serially in a second electrical series circuit, and means including individual shunt circuits for electrically interconnecting successive flip-flop units with successive pulse-gating devices of said second set, to cause said second set of pulse-gating devices to limit the number of flip-flop polarity reversals to not more than two reversals in any single digit-counting cycle.

3. A digital counting system including, in combination with a plurality of flip-flop units and a plurality of pulse-gating devices connected serially in a single electrical series circuit in which successive pulse-gating devices occupy positions intermediate successive flip-flop units, a second set of pulse-gating devices connected serially in a second electrical series circuit, and means operable upon said second set of pulse-gating devices to limit the number of flip-flop polarity reversals to not more than two reversals in any single digit-counting cycle.

References Cited in the file of this patent

UNITED STATES PATENTS

| | | |
|---|---|---|
| 2,644,887 | Wolfe | July 7, 1953 |
| 2,823,856 | Booth et al. | Feb. 18, 1958 |
| 2,888,556 | Richards | May 26, 1959 |

OTHER REFERENCES

The Junction Transistor as a Computing Element (part 3), by Wolfendale Electronic Engineering, March 1957, pages 136–139.

Transistors I, published by RCA Laboratories, March 1956, pages 647 to 649.

Proceedings of the IRE, vol. 41, No. 10, October 1953, pages 1313 to 1320, "Electronic Circuits of the NAREC Computers," by Paul C. Sherertz.

Electronics, March 1956, pages 174 to 178, "High-Speed Counter Uses Surface Barrier Transistors," by Eugen Gott.

Electronic Engineering, February 1957, pages 83 to 87, "The Junction Transistor as a Computing Element," by E. Wolfendale et al.